(12) United States Patent
Hasberg et al.

(10) Patent No.: US 10,520,949 B2
(45) Date of Patent: Dec. 31, 2019

(54) METHOD AND DEVICE FOR LOCALIZING A VEHICLE IN ITS SURROUNDINGS

(71) Applicant: Robert Bosch GmbH, Stuttgart (DE)

(72) Inventors: Carsten Hasberg, Ilsfeld-Auenstein (DE); Stefan Nordbruch, Kornwestheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 15/521,839

(22) PCT Filed: Oct. 13, 2015

(86) PCT No.: PCT/EP2015/073641
§ 371 (c)(1),
(2) Date: Apr. 25, 2017

(87) PCT Pub. No.: WO2016/066419
PCT Pub. Date: May 6, 2016

(65) Prior Publication Data
US 2017/0248962 A1      Aug. 31, 2017

(30) Foreign Application Priority Data
Oct. 28, 2014   (DE) .................. 10 2014 221 888

(51) Int. Cl.
*G05D 1/02* (2006.01)
*G01S 19/42* (2010.01)
(Continued)

(52) U.S. Cl.
CPC ............ *G05D 1/0246* (2013.01); *G01S 19/42* (2013.01); *G05D 1/0088* (2013.01); *G08G 1/096791* (2013.01); *H04L 67/12* (2013.01)

(58) Field of Classification Search
CPC .... G01S 19/42; G05D 1/0088; G05D 1/0246; G08G 1/096791; H04L 67/12;
(Continued)

(56) References Cited

U.S. PATENT DOCUMENTS 5,584,035 A * 12/1996 Duggan .............. G06F 3/04817
345/619
6,922,632 B2 * 7/2005 Foxlin .................... G01C 21/16
342/357.31
(Continued)

FOREIGN PATENT DOCUMENTS

CN          102107661 A       6/2011
CN          102576075 A       7/2012
(Continued)

OTHER PUBLICATIONS

International Search Report for PCT/EP2015/073641, dated Jun. 7, 2016.

*Primary Examiner* — Angelina Shudy
(74) *Attorney, Agent, or Firm* — Norton Rose Fulbright US LLP; Gerard Messina

(57) ABSTRACT

A method and a device for localizing a vehicle in its surroundings, the vehicle having surround sensors, which at first times detect views of the surroundings using the surround sensors as sensor views and supply these to an evaluation unit, and having a communication interface, via which at second times current surroundings data regarding the current surroundings of the vehicle are transmitted to the evaluation unit, and the localization of the vehicle occurs in that in the evaluation unit the surroundings data, which were detected by the surround sensors at first times, and the temporally corresponding surrounding data, which were transmitted via the communication interface, are superimposed on one another. If it is detected that features in the surroundings data detected by the sensors and/or features in (Continued)

the surroundings data supplied via the communication interface occur multiple times in the data pertaining to one point in time and these represent one or multiple objects, these are transmitted only once to the evaluation device and, for a repeated occurrence of the features in the data pertaining to one point in time, only the positional data of the repeatedly occurring object are transmitted anew.

12 Claims, 3 Drawing Sheets

(51) Int. Cl.
 *G05D 1/00* (2006.01)
 *G08G 1/0967* (2006.01)
 *H04L 29/08* (2006.01)

(58) Field of Classification Search
 CPC ....... B60W 2050/065; B60W 2420/42; B60W 2420/52; B60W 2550/10; B60W 2550/22; B60W 2550/402; B60W 2550/408; B60W 40/04; G06K 9/00791
 USPC .......................................................... 701/23
 See application file for complete search history.

(56) References Cited

U.S. PATENT DOCUMENTS

| | | | | |
|---|---|---|---|---|
| 7,148,913 | B2* | 12/2006 | Keaton | G06F 3/011 348/169 |
| 8,934,709 | B2* | 1/2015 | Saptharishi | G06K 9/00771 382/159 |
| 9,240,029 | B2* | 1/2016 | Lynch | G01C 21/20 |
| 9,335,766 | B1* | 5/2016 | Silver | G05D 1/021 |
| 9,507,346 | B1* | 11/2016 | Levinson | G05D 1/0214 |
| 9,612,123 | B1* | 4/2017 | Levinson | G01C 21/32 |
| 9,632,502 | B1* | 4/2017 | Levinson | G01S 7/4972 |
| 9,734,455 | B2* | 8/2017 | Levinson | G06N 7/005 |
| 10,056,001 | B1* | 8/2018 | Harris | B64C 39/024 |
| 10,409,284 | B2* | 9/2019 | Kentley-Klay | G05D 1/0214 |
| 2004/0073360 | A1* | 4/2004 | Foxlin | G01C 21/16 701/517 |
| 2010/0198513 | A1* | 8/2010 | Zeng | B60W 40/02 701/300 |
| 2011/0190972 | A1* | 8/2011 | Timmons | G01C 21/34 701/31.4 |
| 2011/0210965 | A1* | 9/2011 | Thorpe | G06T 7/593 345/419 |
| 2013/0325243 | A1* | 12/2013 | Lipkowski | G05D 1/024 701/25 |
| 2014/0121964 | A1* | 5/2014 | Stanley | G05D 1/0257 701/514 |
| 2014/0350852 | A1* | 11/2014 | Nordbruch | G06K 9/00818 701/523 |
| 2015/0025917 | A1* | 1/2015 | Stempora | G06Q 40/08 705/4 |
| 2015/0377607 | A1* | 12/2015 | Einecke | G01B 11/026 382/104 |
| 2016/0207526 | A1* | 7/2016 | Franz | G06K 9/00812 |
| 2016/0305794 | A1* | 10/2016 | Horita | G01C 21/3602 |
| 2017/0120904 | A1* | 5/2017 | Kentley | B60W 30/09 |
| 2017/0124476 | A1* | 5/2017 | Levinson | G05D 1/0088 |
| 2017/0124781 | A1* | 5/2017 | Douillard | B60Q 1/26 |
| 2017/0248963 | A1* | 8/2017 | Levinson | G05D 1/0278 |
| 2017/0316333 | A1* | 11/2017 | Levinson | G06N 99/005 |
| 2017/0351261 | A1* | 12/2017 | Levinson | G05D 1/0291 |
| 2018/0059779 | A1* | 3/2018 | Sisbot | B60R 1/00 |
| 2018/0061129 | A1* | 3/2018 | Sisbot | G06T 19/006 |
| 2018/0204111 | A1* | 7/2018 | Zadeh | G06N 3/0454 |
| 2018/0217251 | A1* | 8/2018 | Stanley | G01S 13/885 |
| 2018/0233047 | A1* | 8/2018 | Mandeville-Clarke | B62D 15/0255 |
| 2018/0282955 | A1* | 10/2018 | McClendon | E01C 23/222 |
| 2018/0292834 | A1* | 10/2018 | Kindo | B60W 30/00 |
| 2018/0307915 | A1* | 10/2018 | Olson | G06K 9/3233 |
| 2019/0084577 | A1* | 3/2019 | Nobre | B60W 50/0097 |
| 2019/0101649 | A1* | 4/2019 | Jensen | G01S 17/89 |
| 2019/0137287 | A1* | 5/2019 | Pazhayampallil | G01C 21/32 |
| 2019/0145784 | A1* | 5/2019 | Ma | G01C 21/32 701/448 |
| 2019/0176794 | A1* | 6/2019 | Pinto, IV | B60T 17/22 |
| 2019/0271559 | A1* | 9/2019 | Colgate | G06T 7/70 |
| 2019/0272446 | A1* | 9/2019 | Kangaspunta | G06F 16/29 |

FOREIGN PATENT DOCUMENTS

| | | |
|---|---|---|
| CN | 103538588 A | 1/2014 |
| DE | 102009044284 A1 | 4/2010 |
| DE | 102010002092 A1 | 12/2010 |
| DE | 102012211391 A1 | 1/2014 |
| DE | 102012219637 A1 | 4/2014 |
| EP | 1669273 A2 | 6/2006 |
| JP | H082228 A | 1/1996 |
| JP | H0822281 A | 1/1996 |
| JP | 2007156754 A | 6/2007 |
| JP | 2009168567 A | 7/2009 |
| JP | 2014089691 A | 5/2014 |

* cited by examiner

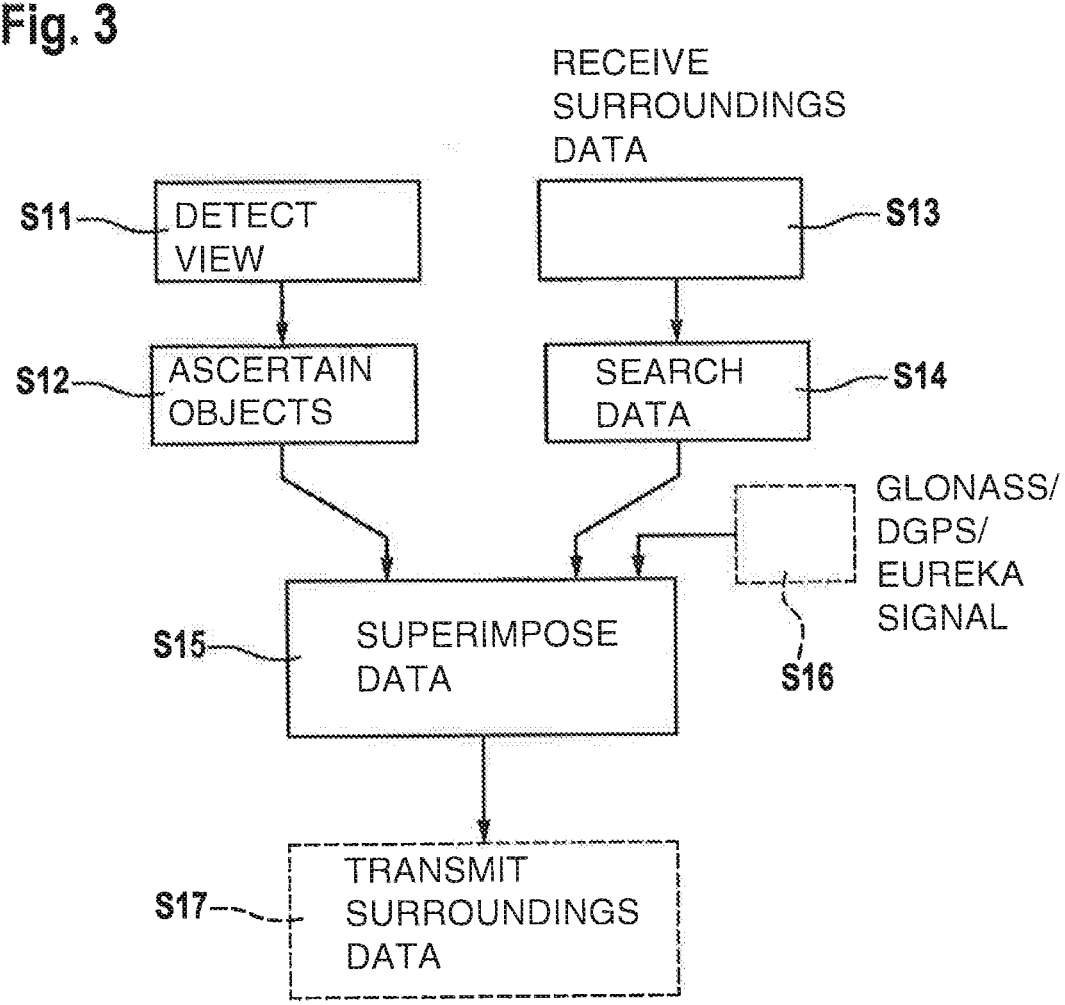

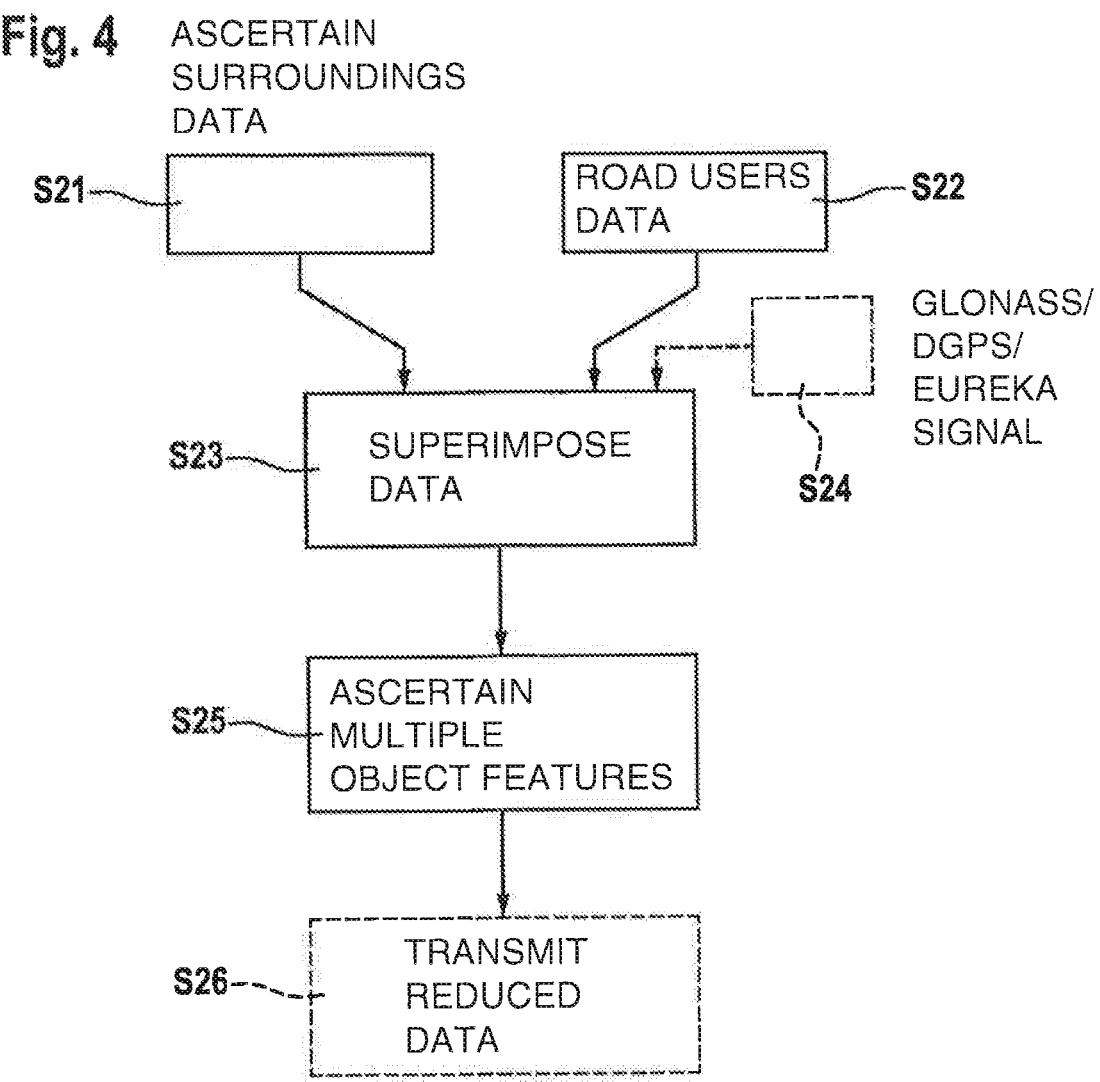

METHOD AND DEVICE FOR LOCALIZING A VEHICLE IN ITS SURROUNDINGS

FIELD OF THE INVENTION

The present invention relates to a device and a method for localizing a vehicle in its surroundings, the vehicle having surround sensors, which at first times detect views of the surroundings using surround sensors and supply these to an evaluation unit, and the vehicle furthermore having a communication interface, via which at second times up-to-date surroundings data regarding the current surroundings of the vehicle are transmitted to the evaluation unit. The localization of the vehicle occurs in that the surroundings data, which were detected at first times by the surround sensors, and the temporally corresponding surroundings data, which were transmitted via the communication interface, are superimposed on one another in the evaluation unit. If it is detected that features in the surroundings data detected by the sensors and/or features in the surroundings data supplied via the communication interface occur multiple times in the data pertaining to one point in time and these represent one or multiple objects, then these are transmitted only once to the evaluation unit and, in the event of a repeated occurrence of the features in the data pertaining to one point in time, only these positional data of the repeatedly occurring object are transmitted once more.

BACKGROUND INFORMATION

German patent document DE 10 2004 075 922 A1 discusses a device for transmitting image data from a video camera situated in a vehicle to an image evaluation unit situated in a vehicle at a distance from the video camera, a device for data reduction being provided in spatial proximity to the video camera, which reduces the image data produced by the video camera in a manner adapted to the image evaluation unit and the reduced image data being transmitted to the image evaluation unit.

SUMMARY OF THE INVENTION

Modern driver assistance systems and vehicle guidance systems, which guide vehicles in highly automated or autonomous fashion, require a localization of the vehicle in its surroundings that is as exact as possible. An aspect of the present invention is to improve the localization of a vehicle in its surroundings in that views of the surroundings of the vehicle are detected by surround sensors and are supplied to evaluation units. Up-to-date surroundings data regarding the current surroundings of the vehicle are transmitted via a communication interface, and thus a highly precise localization of the vehicle is made possible, it being possible at the same time to reduce the data transmission from the surround sensors to the evaluation unit and/or the data transmission from the communication interface to the evaluation unit and/or the data transmission from infrastructure devices to the communication interface of the vehicle, without having to accept losses regarding the transmitted information in the process.

According to the present invention, this is achieved by the combination of the features described herein. Advantageous further developments and refinements are derived from the further descriptions herein.

In the process, features in the image information, which are transmitted for example by a video camera mounted in the vehicle to an evaluation unit likewise mounted in the vehicle, are transmitted multiple times. When transmitting this information, each of these image features must be transmitted separately, which results in a very great quantity of information to be transmitted and to be processed. By transmitting each of these image features only once and by additionally transmitting, in the event of a repeated occurrence of these features in the image, only the new position of the feature in this image, it is possible to reduce the quantity of the image information to be transmitted and to be evaluated significantly.

The described idea is not limited to a video sensor system and the transmission of image information, but may also be applied to a stereo-video sensor system or radar sensor system, lidar sensor system, ultrasonic sensor system or a combination of these in that respective features of the object detection in the vehicle surroundings, on the basis of which it is possible to infer the type of object, are transmitted and processed further.

Advantageously, the features existing multiple times in a sensor view are objects such as pedestrian crosswalk stripes, guardrail sections, guardrail posts on which the guardrails are fastened, broken lane markings for delineating adjacent driving lanes, delineator posts marking the edge of the roadway, directional arrows on the roadway that signal the driving direction on the respective lane or similar features occurring multiple times and repeatedly within the sensor information. In this connection, there may be a provision for the respective characteristics in the sensor information to be defined and programmed in prior to taking the method of the present invention into operation. It is furthermore conceivable that an algorithm is executed in connection with the present invention, which searches for regularly recurring object patters in the sensor information and, if these objects occur with sufficient frequency, that the respective object characteristics are extracted by this software and stored and supplemented in a database of the features that exist multiple times so that the number of the features that exist multiple times may be continuously increased and adapted to the respective situation.

It is furthermore advantageous that the frequent and regularly occurring features in the sensor data are ascertained using a filter adapted to the one or to the multiple objects. Particularly suitable for this purpose is the use of a comb filter or a data processing algorithm that is able to detect regularly recurring patterns.

It is furthermore advantageous that the first times and the second times are identical. This achieves the result that the data for localizing the vehicle, which were on the one hand obtained by the sensor from the surroundings of the vehicle and which are on the other hand received via a communication interface, concern identical times and thus both information sources describe the same point in time and may thus be superimposed. This makes it possible to determine the location of the vehicle in its surroundings even more precisely.

Furthermore it is possible that the localization of the vehicle is a highly precise localization and that the vehicle may be moved autonomously or in automated fashion in the current vehicle surroundings independently, that is, without driver intervention. In the case of automated or autonomous driving interventions, in which the driver is not directly participating in the task of driving, a highly precise knowledge of the vehicle surroundings is necessary, for which purpose it is advantageous to use the superimposition of multiple items of information of different information sources.

It is furthermore advantageous that the highly precise localization is a determination of the current location of the vehicle in its vehicle surroundings with a precision of approximately +/−10 centimeters. This precision is particularly advantageous since it very closely approximates the distance estimation capacity of a human driver.

It is furthermore advantageous that the method additionally uses a GPS signal or a DGPS (differential GPS) signal. As an alternative to the GPS (global positioning system) signal, it is also possible to use a Glonass signal, a Eureka signal or a signal of another satellite positioning system or several of these signals simultaneously.

It is furthermore advantageous that the surroundings data are detected by a sensor system that is a radar sensor system, a lidar sensor system, a video sensor system, an ultrasonic sensor system or a combination of these sensor types. Particularly in the context of autonomous or automated driving, a combination of several sensor types that differ from one another is necessary, which is able to provide a trustworthy situation of the vehicle surroundings by superimposition.

It is furthermore advantageous that the current surroundings data, which are transmitted to the vehicle via the communication network, are surroundings data that were detected by vehicle sensor systems of other vehicles. The other vehicles are road users that traveled the same vehicle surroundings just prior to the host vehicle and in the process collected surroundings data using their vehicle sensor systems and transmitted these data via a communication interface to a data-infrastructure unit. The host vehicle, which is currently traveling the same vehicle surroundings, receives the previously detected data via the infrastructure unit and is thereby able to ascertain its own vehicle position in a highly precise manner. It is important in this regard that only those data are used that are still current, that is, data that originate from vehicle sensor systems whose vehicles traveled the same vehicle surroundings only recently. It is particularly advantageous if the duration, within which the surroundings data are regarded as still current, is a period of time up to a maximum of 5 minutes, 10 minutes or 15 minutes. Advantageously, surroundings data that are older than this period of time, can no longer be regarded as current and thus can no longer be taken into account.

It is furthermore advantageous that the current surroundings data are items of information that were detected and provided by vehicle sensor systems of vehicles that previously detected the same vehicle surroundings. This provides an infrastructure service that automatically detects current surroundings situations and provides them to subsequent vehicles, the subsequent vehicles in turn detecting data and providing these to vehicles that pass the same location at a later point in time. This measure makes it possible to update data regarding changing surroundings situations and always to provide up-to-date data. These data are uploaded to a data server, are stored and held ready for download by other road users that travel the same route section at a later time.

It is furthermore advantageous that the communication interface is a mobile telephone connection or a digital radio network or a vehicle-to-infrastructure network (C2I network) or a vehicle-to-vehicle network (C2C network) or an interface to a navigation system. The navigation system may be in particular a vehicle having a stored digital map or a vehicle that accesses digital map data completely or at least partially via an interface to a data cloud.

The implementation of the method of the present invention in the form of a control element provided for a control unit of an adaptive distance and velocity control of a motor vehicle is of particular importance. For this purpose, a program, which is executable on a computer, in particular on a microprocessor or signal processor, and is suitable for carrying out the method of the invention, is stored on the control element. In this case, the present invention is thus implemented by a program stored in the control element such that this control element equipped with the program represents the present invention in the same manner as the method which the program is suited to implement. In particular, an electrical storage medium, for example a read-only memory, may be used as control element.

Additional features, application options and advantages of the present invention result from the following description of exemplary embodiments of the present invention, which are shown in the figures of the drawing. In this context, all of the described or represented features, alone or in any combination, form the subject matter of the present invention, regardless of their combination in the patent claims or their antecedent reference, and regardless of their wording and representation in the specification and in the drawings.

Exemplary embodiments of the present invention are explained below with reference to drawings.

BRIEF DESCRIPTION OF THE DRAWINGS

FIG. 3 shows a schematic flow chart of the method of the present invention.

FIG. 4 shows another schematic flow chart of a further specific embodiment of the method of the present invention.

DETAILED DESCRIPTION

Figure 1:
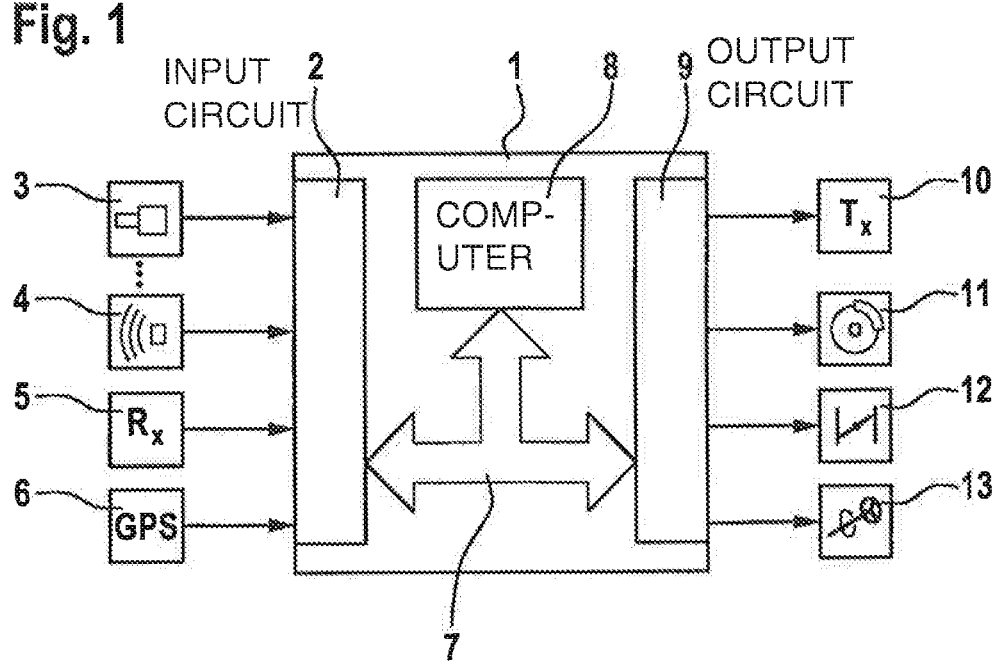
FIG. 1 shows a schematic block diagram of a specific embodiment of the device of the present invention.

FIG. 1 shows an evaluation unit 1, which is advantageously situated within the vehicle, but which may alternatively also be provided outside of the vehicle near or on an external server. This evaluation unit 1 includes an input circuit 2, by which input data may be supplied to evaluation unit 1. Input circuit 2 is supplied with signals of a first surroundings sensor system 3 as input data, which may be for example a video sensor system that detects the vehicle surroundings in front of the vehicle. Furthermore, input circuit 2 is supplied with data of a second surroundings sensor system 4, the number of the surroundings sensor systems not necessarily being limited to two, but being able to comprise arbitrarily many different sensor types. In the exemplary embodiment shown, the second surroundings sensor system is developed as a radar sensor system. As further surroundings sensor systems, a lidar sensor system and/or an ultrasonic sensor system may be provided, which detect the surroundings of the vehicle and supply it to the input circuit 2. Furthermore, input circuit 2 is supplied with data of a receiving antenna 5. This receiving antenna 5 includes an antenna and a receiving device and receives in the case of a car-to-car solution (C2C) data from other road users or receives in the case of a car-to-infrastructure solution (C2I) data from infrastructure devices, which collect and hold surroundings information that originates from vehicles that traveled the current vehicle surroundings a short time prior and directly transmitted their ascertained surroundings data to the infrastructure service or to other road users. Furthermore, a positional signal is supplied to input circuit 2, which originates from a position-determination device 6. This position-determination device 6 may be for example a satellite positioning system, which ascertains its own position coordinates on the basis of received satellite signals or is able to determine the current vehicle situation using another non-satellite-supported positional signal. The data supplied to input circuit 2 are supplied by a data exchange device 7, which may be in particular a data bus, to a computing device 8, which may be configured as a microprocessor, a digital signal processor or an ASIC. The method of the present invention runs on this computing device 8, which may be in the form of software, and from the supplied input data ascertains output signals that are transmitted by computing device 8 via data exchange device 7 to output circuit 9. Via output circuit 9, an output signal is transmitted for example to a transmitting antenna 10, whereby the current surroundings data ascertained in computing device 8 are supplied to other road users or to an infrastructure service, which may be implemented for example as an external data server. There is a further provision for output circuit 9 to output control signals to deceleration devices 11 of the vehicle if computing device 8 has ascertained that the current vehicle velocity is to be reduced. There is a further provision for output circuit 9 to output signals to an power-regulating control element 12 of the vehicle drive if computing device 8 has determined that the current vehicle velocity is to be increased. As another output signal, the present invention provides for output circuit 9 to output an actuating signal to a steering controller 13, whereby the vehicle wheels may be changed in their steering angle and the currently traveled direction of the vehicle may be changed. The objects in the surroundings of the vehicle detected by surroundings sensor systems 3 and 4, respectively, are supplied to input circuit 2 in the form of object data, an object occurring multiple times in the image, which may be for example a pedestrian crosswalk stripe, a broken lane marking or a guardrail section, being transmitted only once and, if this object is found again in the object data, only the position and the type of the detected object being transmitted anew. This type of data reduction is likewise possible for transmitting current surroundings data via receiving device 5 as well as for the transmission from receiving device 5 to input circuit 2. This type of data reduction is also applicable to the transmission of such recurring objects from output circuit 9 to transmitting device 10 or from transmitting device 10 to other road users or to an external data service. This makes it possible to increase the transmission rate and the processing rate.

Figure 2:
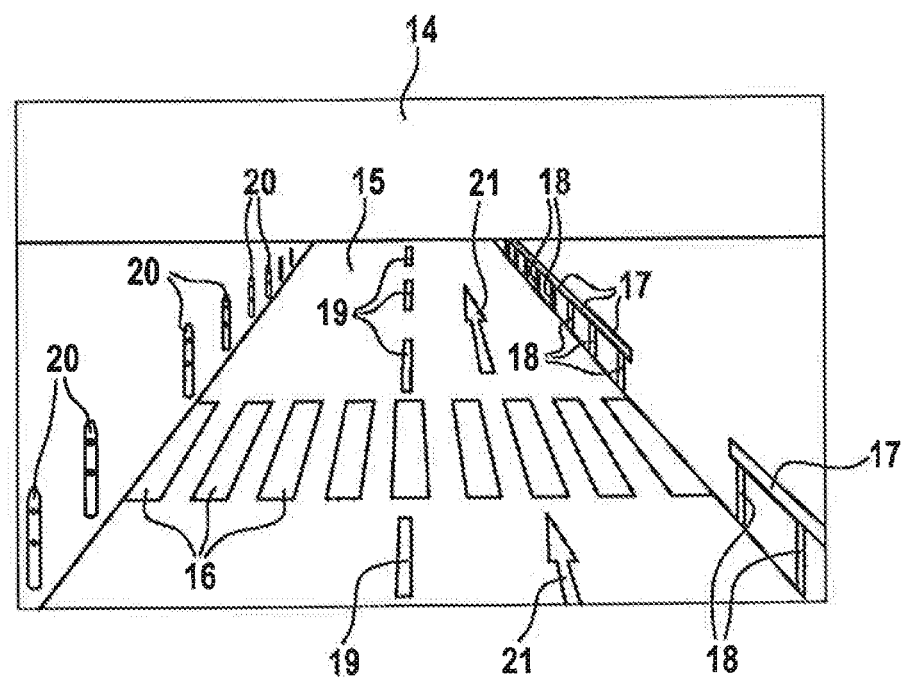
FIG. 2 shows an exemplary view of sensor data for explaining the method of the present invention.

FIG. 2 shows an exemplary view of the surroundings of the vehicle, as it may be detected by a video camera facing forward. Image section 14 is shown in this instance, which indicates the traveled road in the direction of travel in perspective. FIG. 2 shows roadway 15 ahead of the vehicle, which is delineated in the middle by broken lane markings 19 and at the edges by guardrails 17, 18 as well as by delineator posts 19. Furthermore, a pedestrian crosswalk 16 is shown in the detected vehicle surroundings as well as direction arrows 21 applied on the roadway. Features in this sensor view that occur several times may be reduced in their data volume in accordance with the present invention when transmitted to subsequent evaluation units in that these objects are transmitted only once and, in the event that they recur, only their new position and their object type need to be transmitted. The object type is to be understood as a classification as direction arrows, delineator posts or similar objects. In the example shown, the pedestrian crosswalk is indicated by multiple crosswalk stripes 16 that are horizontally arranged side by side and whose shape, color, composition and size are identical if the perspective view is converted into a top view. According to the present invention, such a pedestrian crosswalk stripe 16 is transmitted only once to the subsequent computing device 8 and in the transmission of the further image contents, when the same object is detected again, that is, in the present case when another pedestrian crosswalk stripe 16 is detected, only the information is transmitted that it is again a pedestrian crosswalk stripe 16 as well as the newly detected position of the recurrence. Likewise, in the represented image section, the guardrail section 17 between two guardrail posts may be detected as an object in accordance with the present invention and transmitted only once and a data reduction may be performed if this guardrail section 17 appears again. Likewise, in the represented image section, it is necessary to transmit the data of the guardrail post 18 only once and, in the event of a recurrence of guardrail posts 18 in image section 14, to transmit only their new position. In the same manner, the broken lane marking 19, which separates the two lanes from each other, may also be subjected to a data reduction for transmitting the image information. As another example, a sequence of delineator posts 20 is shown on the left roadway edge, which are likewise identical in their composition and which is why the reduction method of the present invention may also be applied to them. As another object, a direction arrow 21 is shown on the roadway in image section 14, which is detected at regular intervals and which allows for example for a precise localization of the vehicle in the lateral direction if navigation data are available that provide the number and direction of the existing lanes.

FIG. 3 shows a first exemplary embodiment of the method according to the present invention byway of a flowchart. The flowchart shown, however, is schematic and is always run through anew during the driving operation of the vehicle. For this purpose, the present invention provides for a vehicle sensor system 3, 4 to detect a view of the surroundings in step S11. Prior to transmitting the vehicle surroundings data to input circuit 2 of evaluation unit 1, an ascertainment is made in step S12 whether certain object features occur multiple times in the sensor system data, for example in that multiple delineator posts 20, multiple pedestrian crosswalk stripes 16, multiple lane markings 19, multiple guardrail posts 18, multiple guardrail sections 17 or multiple direction arrows 21 exist. If the existence of multiple such features was detected, then the data volume is reduced for transmitting the data to input circuit 2 of evaluation unit 1 in that each of these features is transmitted only once and, if these objects recur in the surroundings data, only their type and the new position in the surroundings view are to be transmitted anew. At the same time, according to step S13, surroundings data are received from another vehicle or an external data service, which are for example current surroundings data that were just previously provided by a vehicle that traveled the same vehicle surroundings. In subsequent step S14, a search is likewise performed within the surroundings data for a recurrence of certain objects so that it is possible to perform a data reduction for transmitting the surroundings data from the data server to the communication interface of the vehicle and or alternatively from the communication interface of the vehicle to evaluation unit 1. Subsequently, both the vehicle sensor system data as well as the provided vehicle surroundings data are superimposed on one another in step S15 in evaluation unit 1 so that it is possible to perform an exact localization of the vehicle in the surroundings of the vehicle on the basis of the superimposition of the two data sources. Optionally, there may be a further provision additionally to use a satellite navigation signal, for example a GPS signal, a DGPS (differential GPS) signal, a Glonass signal or a Eureka signal in order to perform the localization of the vehicle in the surroundings of the vehicle as precisely as possible. Because step S16 is provided optionally, its frame in FIG. 3 is drawn only as a dashed line. Furthermore, it is also possible for step S17 to be provided optionally, which is why this too is shown in FIG. 3 only as a dashed line. Optional step S17 may provide for the surroundings data currently present in the vehicle with the highly precise vehicle localization to be made available via a transmitting device 10 to other road users, which will pass the same vehicle surroundings in the subsequent time period, in that these data are transmitted directly to receiving devices of the vehicles via a vehicle-to-vehicle network or are transmitted indirectly to an external data server by vehicle-to-infrastructure communication, are updated there and are held ready for retrieval for other road users.

FIG. 4 shows another specific embodiment of the method of the present invention, the sensor system data in this case not being reduced prior to transmission to evaluation unit 1, but rather a data reduction being performed only after the superimposition of the sensor system data with the surroundings data, that is, prior to providing them to other road users. Thus, the method according to FIG. 4 may be used as an alternative to the method from FIG. 3, or also in combination with the latter.

In step S21 of FIG. 4, surroundings data in the surroundings of the vehicle are again ascertained by a vehicle sensor system 3, 4, and these are transmitted from vehicle sensor system 3, 4 to input circuit 2 of evaluation unit 1. At the same time, according to step S22, data are received from road users who passed the same vehicle surroundings a short time previously and whose data are still up-to-date. For this purpose, these vehicles either transmit the surroundings data directly to the host vehicle or the other road users transmit the surrounding data indirectly via an external data server so that the updated data are uploaded to the data server and are kept ready there for other road users. These external vehicle data, which describe the vehicle surroundings, are received via a receiving device 5 of the vehicle and are supplied via input circuit 2 to evaluation unit 1. In evaluation unit 1, according to step S23, the superimposition of the sensor system data with the externally provided surroundings data is performed, whereby an exact positioning of the vehicle in the area of the surroundings of the vehicle may be determined. As in the exemplary embodiment shown in FIG. 3, here it may also be optionally provided that a satellite positioning signal, for example a GPS signal, a DGPS (differential GPS) signal, a Glonass signal or a Eureka signal is provided in accordance with step S24, and that this signal is additionally used for the exact localization of the vehicle in the vehicle surroundings. If the localization of the vehicle was performed in accordance with step S23, then an ascertainment is made in the surroundings data in the following step S25 as to whether certain object features are present multiple times. These object features may be object data regarding pedestrian crosswalk stripes 16, regarding lane markings 19, regarding delineator posts 20, regarding direction of travel arrows 21, regarding guardrail sections 17 or guardrail posts 18. If such objects are determined multiple times in the surroundings data, then their surroundings data are transmitted only once and, regarding the newly occurring position in the surroundings data, only their new position is transmitted, whereby a data reduction is achieved. In subsequent step S26, the surroundings data reduced in accordance with the present invention may be transmitted by a transmitting device 10 directly to other road users or may be transmitted indirectly to other road users via a traffic infrastructure service by way of an external data server in that these data are updated and are held ready for the other road users that will pass the same vehicle surroundings at a later time.

What is claimed is:

1. A method for localizing a vehicle in its surroundings, the vehicle having surround sensors, the method comprising:
   detecting, via the surround sensors at a first time, initial surroundings data, corresponding to surrounding views of the vehicle, via the surround sensors of the vehicle;
   transmitting, via a transmitting device, from an external source at a second time, via a communication interface of the vehicle, current surroundings data at the second time of the vehicle to the evaluation unit of the vehicle;
   superimposing, via the evaluation unit, the initial surroundings data from the vehicle and the current surroundings data from the external source on one another to provide a superimposition of the initial surroundings data and the current surroundings data; and
   determining, via the evaluation unit, a location of the vehicle, via the evaluation unit, based on the superimposition of the initial surroundings data and the current surroundings data, wherein the location of the vehicle is determined to move the vehicle autonomously or in an automated manner in the current vehicle surroundings, independently without driver intervention; and
   providing, via the evaluation unit, superimposition of the initial surroundings data and the current surroundings data of the vehicle to other vehicles;
   wherein features in the initial surroundings data detected by the surround sensors and/or features in the current surroundings data supplied via the communication interface, which occur multiple times in the superimposition of the initial surroundings data and the current surroundings data associated with a particular time and represent one or multiple objects, are transmitted only once and, for a repeated occurrence of the features in the data pertaining to the particular time, only positional data of a repeatedly occurring object are again transmitted.

2. The method of claim 1, wherein the features existing multiple times in a sensor view include at least one of pedestrian crosswalk stripes, guardrail sections, guardrail posts, broken lane markings, delineator posts, and/or direction arrows on a roadway.

3. The method of claim 1, wherein recurring features in the sensor data are ascertained using a filter adapted to one or multiple objects.

4. The method of claim 1, wherein the first time is the second time.

5. The method of claim 1, further comprising:
   using a GPS signal and/or a differential GPS signal to improve an accuracy of the location of the vehicle.

6. The method of claim 1, wherein the surroundings sensor system includes at least one of a radar sensor system, a lidar sensor system, a video sensor system, an ultrasonic sensor system, and a combination thereof.

7. The method of claim 1, wherein the current surroundings data, which are transmitted via the communication interface to the vehicle, are surroundings data that were detected by vehicle sensor systems of at least one other vehicle that traveled in vehicle surroundings previously traveled by the at least one other vehicle and that are up-to-date.

8. The method of claim 7, wherein the current surroundings data are items of information that were previously detected and provided by sensor systems of the at least one other vehicle that detected the vehicle surroundings.

9. The method of claim 1, wherein the communication interface is a mobile telephone connection, a digital broadcasting network, a vehicle-to-infrastructure network, a vehicle-to-vehicle network, an interface to a navigation system, or an interface to a data cloud.

10. A system for localizing a vehicle in its surroundings, the vehicle having surround sensors, comprising:
   a communications interface;
   a transmitting device to transmit from an external source at a second time, via the communication interface of the vehicle, current surroundings data of the vehicle, wherein the surround sensors are configured to detect, at a first time, initial surroundings data, corresponding to surrounding views of the vehicle; and
   an evaluation unit to superimpose the initial surroundings data from the vehicle and the current surroundings data from the external source, provided by the communications interface, on one another to provide a superimposition of the initial surroundings data and the current surroundings data, and to provide the superimposition of the initial surroundings data and the current surroundings data to other vehicles, wherein the location of the vehicle is determined to move the vehicle autonomously or in an automated manner in the current vehicle surroundings, independently without driver intervention;
   wherein the evaluation unit is configured to detect whether features in the initial surroundings data detected by the surround sensors and/or features in the current surroundings data supplied via the communication interface occur multiple times in the superimposition of the initial surroundings data and the current surroundings data associated with a particular time and represent one or multiple objects, and are transmitted only once, and, for a repeated occurrence of the features in the data pertaining to the particular time, only positional data of a repeatedly occurring object are again transmitted.

11. The method of claim 1, wherein occurring features in the sensor data are ascertained using a filter adapted to one or multiple objects by a comb filter.

12. The method of claim 1, wherein the communication interface is a mobile telephone connection, a digital broadcasting network, a vehicle-to-infrastructure network, a vehicle-to-vehicle network, an interface to a navigation system having a digital map stored in the vehicle, or an interface to a data cloud.

* * * * *